United States Patent
Le Fol

[11] Patent Number: 6,120,013
[45] Date of Patent: Sep. 19, 2000

[54] SYSTEM FOR CONTROLLING A HYDROELASTIC SUPPORT

[75] Inventor: Marcel Le Fol, Domloup, France

[73] Assignees: Automobiles Peugeot, Paris; Automobiles Citroen, Neuilly sur Seine, both of France

[21] Appl. No.: 09/102,769

[22] Filed: Jun. 23, 1998

[30] Foreign Application Priority Data

Jun. 26, 1997 [FR] France .................................. 97 08045

[51] Int. Cl.⁷ ...................................................... F16F 5/00
[52] U.S. Cl. ................................ 267/140.14; 267/140.11; 267/140.13
[58] Field of Search ................................ 267/136, 140.11, 267/140.13, 140.14, 219, 140.15; 188/378, 266.3, 266.4

[56] References Cited

U.S. PATENT DOCUMENTS

| | | | |
|---|---|---|---|
| 4,754,956 | 7/1988 | Barone et al. | 267/140.14 |
| 5,209,460 | 5/1993 | Bouhours et al. | 267/140.13 |
| 5,242,158 | 9/1993 | Robic et al. | 267/140.11 |
| 5,360,089 | 11/1994 | Nakamura et al. | 267/266.4 |
| 5,397,113 | 3/1995 | Kojima et al. | 267/140.14 |

FOREIGN PATENT DOCUMENTS

| | | |
|---|---|---|
| 0 490 717 | 6/1992 | European Pat. Off. |
| 0 490 718 | 6/1992 | European Pat. Off. |
| 0 569 271 | 11/1993 | European Pat. Off. |
| 27 37 985 | 3/1978 | Germany. |

*Primary Examiner*—Robert J Oberleitner
*Assistant Examiner*—Mariano Sy
*Attorney, Agent, or Firm*—Burns, Doane, Swecker & Mathis, L.L.P.

[57] ABSTRACT

The system controls a support (1) interposed between an engine (2) and the structure (3) of an automobile vehicle comprising a work chamber (7) and an expansion chamber (8) filled with liquid and interconnected by a passageway (9), in which the work chamber (7) is partly defined by an elastic movable wall (10) comprising a push member (11) with which cooperates a driving device (12) for applying to this partition wall movements in such manner as to produce in the chamber (7) pressure forces synchronous with the harmonics of the vibrations of the operation of the engine. The system is characterized in that the driving device comprises an electric motor (12) connected to the push member (11) by actuating means (16) actuating in accordance with a reciprocating linear motion, and the system comprises means (22) for controlling the electric motor (13) in speed and angular position by a signal of the operating cycle of the engine.

7 Claims, 3 Drawing Sheets

SYSTEM FOR CONTROLLING A HYDROELASTIC SUPPORT

This application claims priority under 35 U.S.C. §§119 and/or 365 to 97 08045 filed in France on Jun. 26, 1997; the entire content of which is hereby incorporated by reference.

The present invention relates to a system for controlling a hydroelastic support for interposition between two units which are to be suspended with respect to each other.

More particularly, the invention relates to a system for controlling a support of this type for interpostion between an engine or a power unit of an automobile vehicle and the rest of the structure or chassis of the latter for suspending the engine in the vehicle.

Hydroelastic supports of this type have already been disclosed in documents FR-A-2 364 373 and FR-A-2 670 261.

Such a hydroelastic support usually comprises two armatures respectively connected to the two units to be suspended, i.e. to the engine and to the rest of the vehicle, these two armatures being interconnected by a mass of elastomer material.

Further, this support comprises at least one work chamber defined at least partly by the mass of elastomer material and an expansion chamber, these two chambers being filled with liquid and interconnected by a communication passageway.

In such a support, the work chamber is also partly defined by a movable wall of elastic material whose outer side comprises a push member with which cooperates a device for driving said movable wall and imparting to latter controlled movements for the purpose of producing in the work chamber pressure forces which are synchronous with the harmonics of the vibrations of the operation of the engine.

More particularly, these pressure forces are synchronous with the 2nd order harmonics of the excitation vibrations coming from the engine.

In fact, the purpose of these devices is to produce within such a support, which connects the engine to the rest of the structure of the vehicle, forces which oppose the forces produced by the movements of the engine relative to the rest of the structure of the vehicle independently of their origin.

This support therefore produces forces which are in synchronism with those developed by the engine and its operation requires an exterior supply of energy.

This type of support is in fact a particular application to the 2nd order hum of engines with four cylinders in line and a pendular suspension.

Very many vehicles are provided with this type of engine.

And object of the invention is therefore to provide a system for the synchronous control of such a support. This control which is cheaper than an active support control piloted in amplitude and in phase, is a solution compatible with the pendular suspension of engines in which the supports are located in the vertical plane containing the anti-roll axis. Knowing that the excitation occurs at constant amplitude and is independent of the operating speed and load of the engine, it is possible to define a support having a synchronous activation as disclosed in the aforementioned documents.

The invention therefore provides a system for controlling a hydroelastic support for interposition between the engine of an automobile vehicle and the rest of the structure of the vehicle and suspending said engine in the vehicle, of the type comprising two armatures connected respectively to the engine and to the rest of the vehicle, said two armatures being interconnected by a mass of elastomer material, the support comprising at least one work chamber at least partly defined by the mass of elastomer material and an expansion chamber, said two chambers being filled with liquid and interconnected by a communication passageway and of the type in which the work chamber is also partly defined by a movable wall of elastic material whose outer side comprises a push member with which cooperates a device for driving the movable wall and imparting to the latter movements controlled in such manner as to produce in the work chamber pressure forces which are synchronous with the harmonics of the vibrations of the operation of the engine, characterized in that the device for driving the movable wall of the support comprises an electric DC motor whose output shaft is connected to the push member of said movable wall by means for driving said wall with a reciprocating linear motion, and comprises means for controlling said electric motor in speed and angular position by a signal of the operating cycle of the engine.

A better understanding of the invention will be had from the following description which is given solely by way of example with reference to the accompanying drawings, in which.

Figure 1:
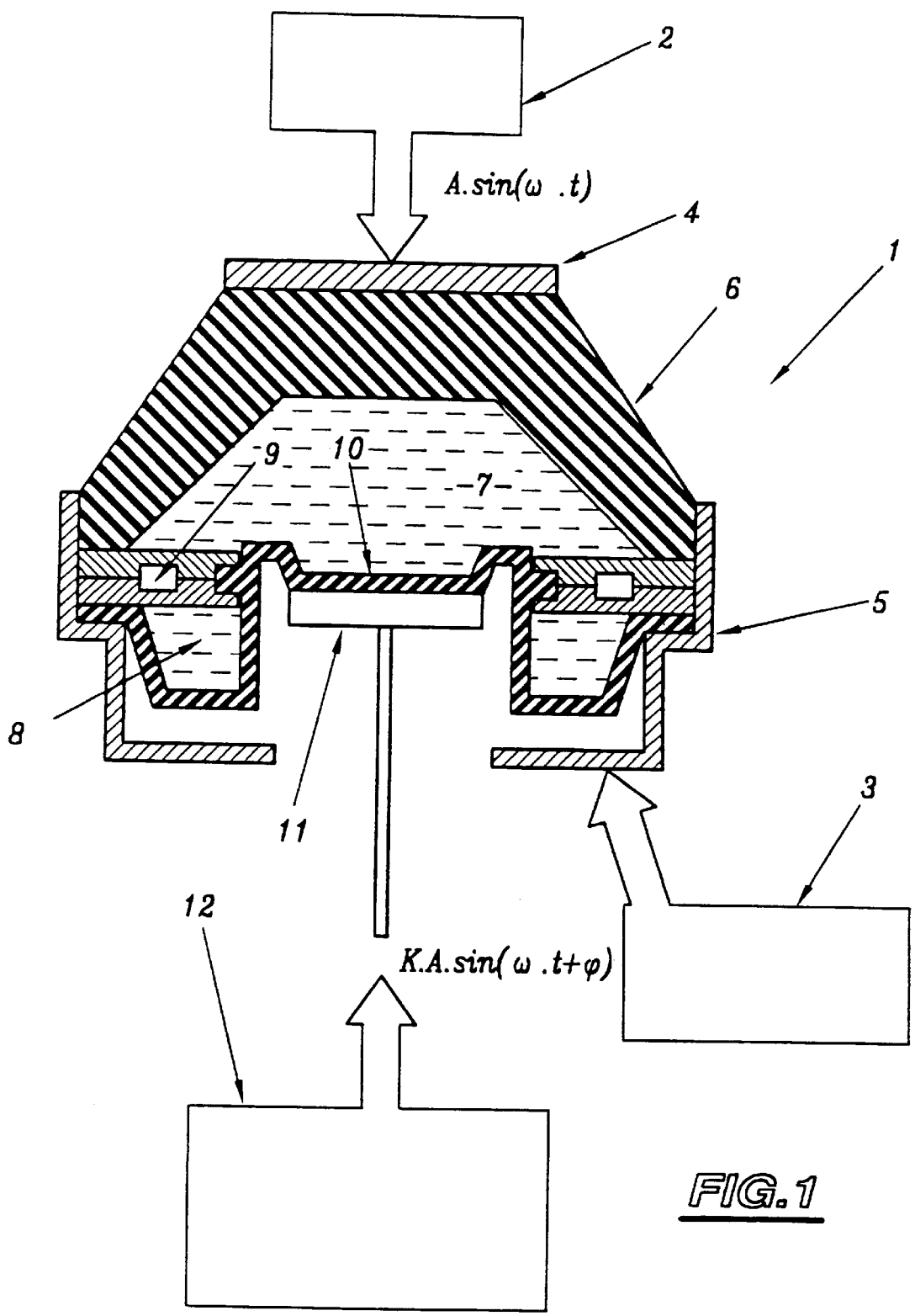
FIG. 1 is a block diagram in section illustrating the structure and the operation of a hydroelastic support included in the arrangement of a control system according to the invention.

A hydroelastic support designated by the general reference numeral 1 is shown in these Figures.

This support has a structure similar to those of the supports disclosed in the aforementioned documents and is adapted to be interposed between two units to be suspended with respect to each other, and more particularly interposed between an engine or power unit, designated by the general reference numeral 2 in FIG. 1, of an automobile vehicle and the rest of the structure or chassis of this vehicle designated by the general reference numeral 3.

Such a support designated by the general reference numeral 1 comprises two armatures or plates designated by the general reference numerals 4 and 5 in FIG. 1, connected respectively to the engine and to the rest of the vehicle, these two armatures being interconnected by a mass of elastomer material designated by the general reference numeral 6.

Further, the support comprises at least one work chamber 7 at least partly defined by the mass of elastomer material 6, and an expansion chamber 8, these two chambers being filled with liquid and interconnected by a communication passageway 9.

In this type of support, the work chamber 7 is also partly defined by a movable wall 10 of elastic material whose outer side comprises a push member 11 with which cooperates a device designated by the general reference numeral 12 for driving this movable wall and imparting to the latter movements controlled in such manner as to produce in the work chamber 7 pressure forces which are synchronous with the harmonics of the vibrations of the operation of the engine.

This hydroelastic support therefore again adopts the design of the supports disclosed in the aforementioned documents concerning the arrangement of the work and expansion chambers and of the communication passageway interconnecting these two chambers, which thus forms a column and permits damping the chopping mode.

These documents may be consulted for a complete description of the structure and operation of this support.

Further, this support also adopts the principle of the valve, but in the system according to the invention, the latter is associated with an active system synchronous with the excitation of the engine with a constant phase relation relative to the crankshaft of the engine.

In this case, there must be filtered the vibrations of the engine related to the thermodynamic cycle of the latter and to the inertias of the reciprocating moving masses, for example between 30 and 200 Hertz, i.e. the hydroelastic support permits reducing and even cancelling out the so called hum phenomenon in the passenger compartment of the vehicle.

There must therefore be adopted a solution consisting in producing in the support vibrations opposed to those of the engine of the vehicle by an exterior supply of energy, i.e. by a synchronous activation of a valve by a control system which will be described hereinafter.

For this purpose, the synchronous support is therefore used which, owing to the reciprocating motion of the valve-piston system of the support produced by the driving device, will cause fluid inside the work chamber 7 to pulsate in phase and at a constant amplitude.

As will be described in more detail hereinafter, this driving is effected by means of an electric DC motor controlled by a phase locking loop system.

If there is a vibratory disturbance of the engine of the vehicle of the form $X_s = A \sin(\omega.t)$, there must be produced a linear motion of the wall of the support of the form $X_p = K.A \sin(\omega.t)$.

As mentioned before, as the vibratory amplitude, i.e. the disturbance, is constant, the correction may be effected in accordance with the same principle.

Further, the system according to the invention employs as an actuator a rotary electric DC motor associated for example with a connecting rod-crank mechanism which converts the rotation of the output shaft of the motor into a reciprocating linear motion of the push member and therefore of the movable wall of the support.

The amplitude of the movement of the piston of the support is fixed as a function of the amplitude of the disturbance of the motor of the vehicle and of the section of the piston of the support.

By a method of calculating by finite elements, it is possible to determine the equivalent piston section of the support.

With a known vibratory amplitude of the engine of the vehicle, it is possible to calculate in a conventional manner the quantity of fluid transferred in the support and to determine the required compensation by removing the same quantity by means of the controlled valve of the support.

The frequency and phase of the excitation signal must then be reproduced by controlling the speed of rotation and the angular position of the electric motor.

Therefore, merely the phase of the disturbing vibration and not the vibration itself needs to be considered.

It is known that the calculators monitoring the operation of vehicle engines provide a signal of the operating cycle or phase of the engine, i.e. corresponding to the top dead centre position of the engine at a constant and known phase shift of the latter, so that it is merely necessary to control the correction by means of this signal.

It is therefore sufficient to employ this signal as an order or instruction for controlling the electric motor thereby as concerns both speed and angular position.

This is for example achieved by means of a phase locking loop.

It is therefore no longer necessary to use the measurement of the movement.

The well known equations of the operation of such an electric motor which permit determining its control need no longer be referred to.

Such an electric motor must be capable of rotating at a maximum speed twice that of the engine of the vehicle, namely about 12,000 rpm, or rotate at the same speed but, in this case, it is necessary to double the activation by a gearing or belt coupling.

This corresponds to a maximum frequency of 200 Hertz.

The electronic part of the control ensures the synchronization between the passage through the top dead centre (TDC=reference point of the engine cycle) of the internal combustion engine with the top position of the piston of this support.

The information relating to the engine of the vehicle is generally a periodic signal of variable frequency. It is in the form of a pulse and the signal is delivered by the calculator of the monitoring of the operation of this engine whose period corresponds to the 2nd harmonic of the vibrations of the operation of the engine whose phase shift $\Delta\phi$ relative to the reference point is a known constant.

For this purpose, this calculator may be for example associated with detecting means formed for example by a sensor of the inductive type of a target or reference mark positioned at the end of the crankshaft.

The signal delivered by this sensor is shaped electronically to obtain a logic signal. The output responds to one pulse per half-rotation of the engine (crankshaft).

Further, there are disposed at the output of the electric motor i.e. for example on the output shaft of the latter which drives the movement of the piston of the support, means for measuring its angular position.

These means may comprise for example an optical or magnetic encoder which delivers pulses.

The means for driving the system according to the invention, e.g. the connecting rod-crank system, is so arranged that a position pulse of this electric motor is shifted in phase $\Delta\phi$ relative to the passage through the top dead centre position in the operating cycle of the engine of the vehicle.

Under these conditions, it is possible to achieve the purpose of the control by setting the measured angular phase of the electric motor to that of the signal delivered by the calculator monitoring the operation of the engine of the vehicle.

A piloting circuit permits achieving this operation in accordance with a principle which will be described herein after.

In fact, this circuit has a conventional structure employing a phase locking loop in which the phase of the signal at the output of the calculator monitoring the operation of the engine consitutes the instruction or set value.

The unit formed by the electric motor and its angular position encoder represents the system to be piloted or controlled and a low-pass filter associated with a power amplifier may be employed as a corrector.

Figure 2:
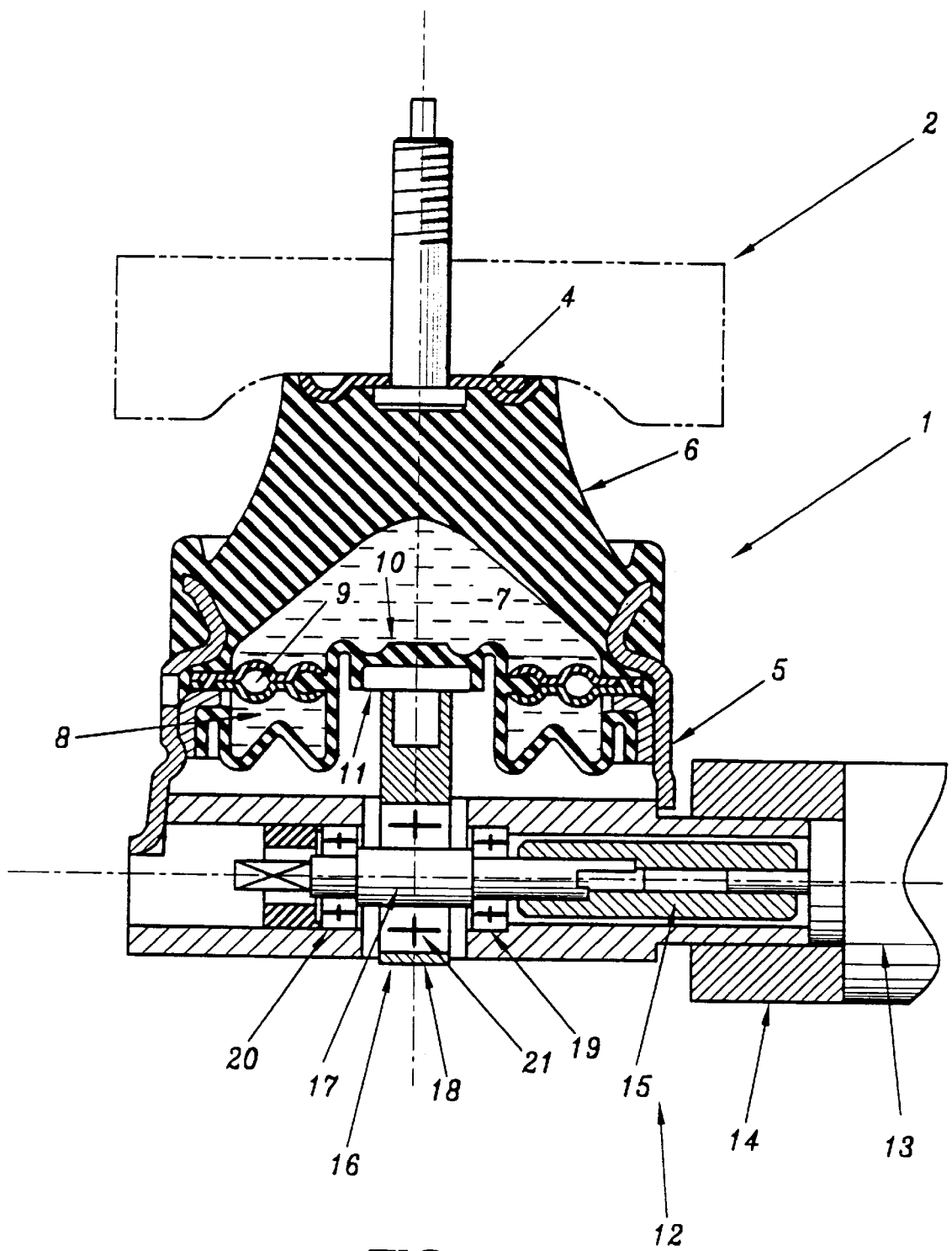
FIG. 2 is a sectional view of an embodiment of such a hydroelastic support.

There are thus shown in FIG. 2 the hydroelastic support 1 with its armatures 4 and 5, the mass of elastomer material 6, the work chamber 7, the expansion chamber 8, the communication passageway 9, the movable wall 10, the push member 11, and the driving device 12.

As mentioned before, this driving device comprises an electric rotary DC motor designated by the general reference numeral 13 in this Figure.

This motor may comprise, as mentioned before, an integrated angular position encoder delivering a pulse signal.

This motor is disposed in support means of any type designated by the general reference numeral 14 in FIG. 2, and the output shaft of the motor comprises connecting means designated by the general reference numeral 15 for connection to a connecting rod-crank system designated by the general reference numeral 16 in this Figure.

Thus for example this output shaft of the electric motor is connected to a connecting rod designated by the general reference numeral 17 around which is disposed an end of a crank designated by the general reference numeral 18 whose other end is associated with the push member 11 of the movable wall 10 of the support.

Guide bearings 19,20, and 21 are respectively disposed on each side of this connecting rod-crank mechanism and between the connecting rod and the crank.

It will therefore be understood that actuation of this rotary motor permits applying through this connecting rod-crank mechanism pressure forces in the work chamber of the support.

For this purpose, the operation of the electric motor is controlled in speed and angular position by a signal of the operating cycle of the engine.

Figure 3:
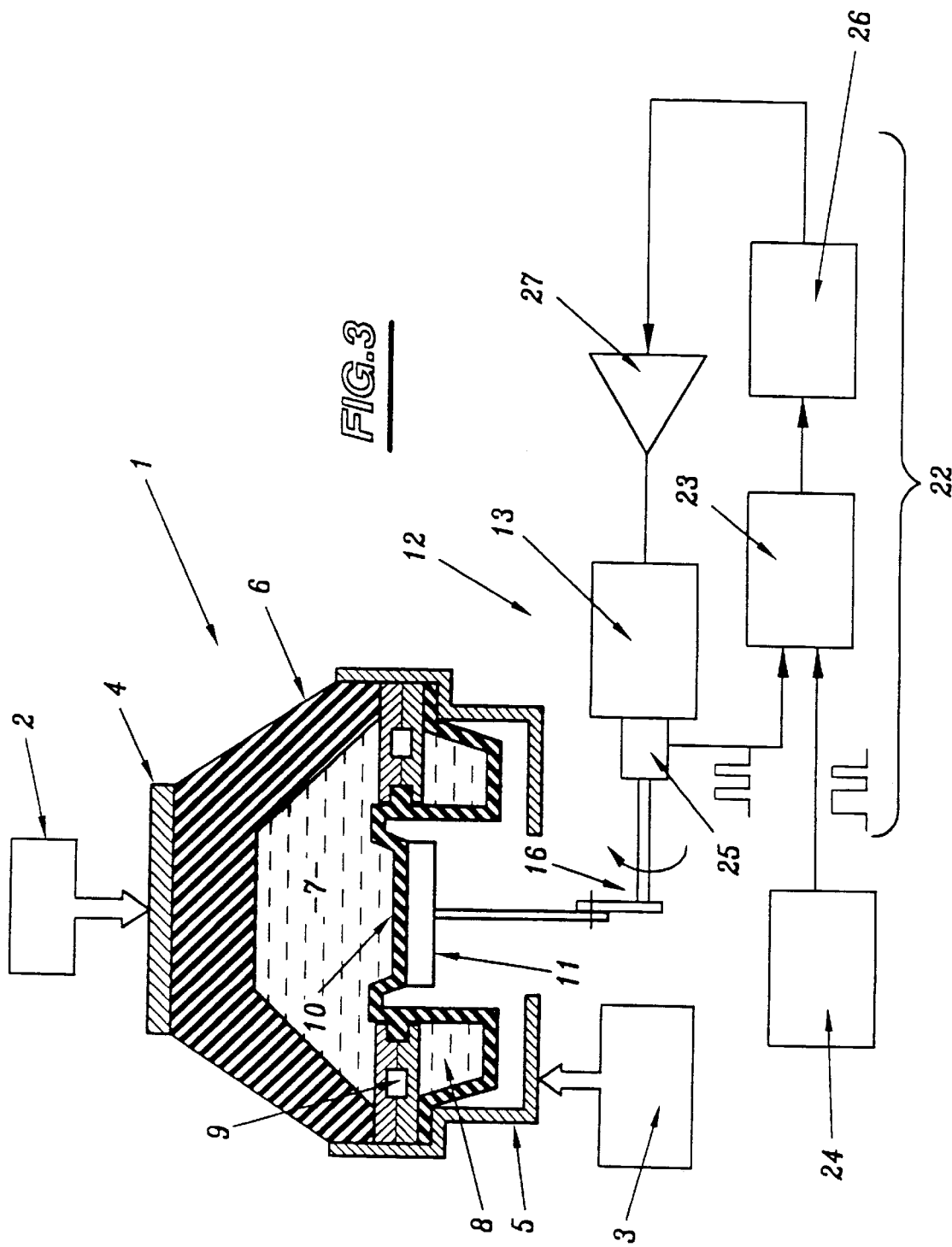
FIG. 3 is a block diagram illustrating an embodiment of a control system according to the invention.

This is illustrated in FIG. 3 in which are shown the hydroelastic support 1 and the driving means 12 connected to the push member 11 of the movable wall 10 of the support.

As explained before, these driving means comprise the electric DC motor 13 whose output shaft is connected by the mechanism, for example of the type having a connecting rod-crank 16, to this push member 11 of the movable wall 10 of the support.

Indeed, the means monitoring the operation of this motor comprise a phase locking loop designated by the general reference numeral 22 in FIG. 3, including a phase comparator, designated by the general reference numeral 23, receiving at the input, as an instruction, a signal of the operating cycle of the engine, for example delivered by a calculator monitoring the operation of the engine, designated by the general reference numeral 24, and a signal of the angular positon of the electric motor, for example delivered by a position encoder 25 associated with the output shaft of the motor or other means.

The output error signal of this phase comparator 23 is connected to a low-pass filter designated by the general reference numeral 26 whose output is connected to the input of amplifying means designated by the general reference numeral 27 for controlling the power supply of the DC motor 13.

It will therefore be understood that it is possible to reproduce the frequency and the phase of the excitation signal of the engine of the vehicle by piloting the speed of rotation and the angular position of this electric motor which permits following the phase of this disturbance vibration.

It must be understood that different embodiments of this control system may be envisaged.

What is claimed is:

1. System for controlling a hydroelastic support for interposition between an engine of an automobile vehicle and a structure of said vehicle for suspending said engine in said vehicle, said support comprising in combination: two armatures respectively connected to the engine and to the structure, a mass of an elastomer material interconnecting said two armatures, said support comprising at least one work chamber defined at least partly by said mass of elastomer material, and an expansion chamber, liquid filling said two chambers, a communication passageway interconnecting said two chambers a movable wall of elastomer material also partly defining said work chamber and having an outer side, a push member associated with said outer side of said movable wall, a device for driving said wall cooperatively connected to said push member for the purpose of applying to said wall movements controlled in such manner as to produce in said work chamber pressure forces which are synchronous with harmonics of vibrations of the operation of said engine, said device for driving said wall comprising in combination: an electric DC motor having an output shaft, actuating means connecting said output shaft to said push member and actuating with a reciprocating linear motion, said device further comprising means for controlling said electric motor in speed and angular position by a signal of the operating cycle of said engine.

2. System according to claim 1, wherein said means for actuating said movable wall comprise a connecting rod-crank mechanism.

3. System for controlling a hydroelastic support for interposition between an engine of an automobile vehicle and a structure of said vehicle for suspending said engine in said vehicle, said support comprising in combination: two armatures respectively connected to the engine and to the structure, a mass of an elastomer material interconnecting said two armatures, said support comprising at least one work chamber defined at least partly by said mass of elastomer material, and an expansion chamber, liquid filling said two chambers a communication passageway interconnecting said two chambers a movable wall of elastomer material also partly defining said work chamber and having an outer side, a push member associated with said outer side of said movable wall, a device for driving said wall cooperatively connected to said push member for the purpose of applying to said wall movements controlled in such manner as to produce in said work chamber pressure forces which are synchronous with harmonics of vibrations of the operation of said engine, said device for driving said wall comprising in combination: an electric DC motor having an output shaft, actuating means connecting said output shaft to said push member and actuating with a reciprocating linear motion, said device further comprising means for controlling said electric motor in speed and angular position by a signal of the operating cycle of said engine;

wherein said controlling means comprise a phase locking loop having an input receiving, as an instruction, said signal of said operating cycle of said engine and a signal of said angular position of said electric motor.

4. System according to claim 3, wherein said signal of said operating cycle of said engine is delivered by a calculator monitoring the operation of said engine.

5. System according to claim 3, wherein said signal of said angular position of said electric motor is delivered by a sensor associated with the output shaft of said motor.

6. System according to claim 4, wherein said signal of said angular position of said electric motor is delivered by a sensor associated with the output shaft of said motor.

7. System according to claim 3, wherein said phase locking loop comprises signal comparing means for delivering an error signal and means for filtering and amplifying said error signal for controlling said electric motor.

* * * * *